United States Patent [19]

Itamoto et al.

[11] Patent Number: 5,383,131
[45] Date of Patent: Jan. 17, 1995

[54] METHOD OF DETERMINING CUTTING TRAJECTORY IN N/C MACHINING SYSTEM

[75] Inventors: Takeshi Itamoto; Kenji Nakao; Shinji Tachikake; Takanori Sakamoto, all of Hiroshima, Japan

[73] Assignee: Mazda Motor Corporation, Hiroshima, Japan

[21] Appl. No.: 91,037

[22] Filed: Jul. 14, 1993

[30] Foreign Application Priority Data

Jul. 14, 1992 [JP] Japan .................. 4-186628

[51] Int. Cl.⁶ .................. G06F 15/46; B23C 3/32
[52] U.S. Cl. .................. 364/474.29; 409/66; 409/84
[58] Field of Search .................. 364/474.29–474.35; 29/558, 557; 409/66, 69, 70, 72, 80, 84, 113, 115, 117; 318/569, 571–572

[56] References Cited

U.S. PATENT DOCUMENTS

| | | | |
|---|---|---|---|
| 4,558,977 | 12/1985 | Inoue et al. | 364/474.29 |
| 4,789,931 | 12/1988 | Kuragano et al. | 364/474.35 |
| 4,866,631 | 9/1989 | Kurgano et al. | 364/474.29 |
| 5,033,005 | 7/1991 | Haske | 364/474.29 |
| 5,223,777 | 6/1993 | Werner et al. | 364/474.29 |

FOREIGN PATENT DOCUMENTS 362204 3/1991 Japan .

Primary Examiner—James Trammell
Attorney, Agent, or Firm—Sixbey, Friedman, Leedom & Ferguson

[57] ABSTRACT

In a numerical control machining system, a leftover area on a work produced by cutting the work with a larger diameter ball end mill is cut with a small diameter ball end mill. When the cutting trajectories of the small diameter ball end mill are determined, the leftover portions are identified in the directions of the cutting trajectories for the larger diameter ball end mill which are set at regular pitches and reference cutting trajectories for the small diameter ball end mill which are the cutting trajectories when cutting the leftover portions with the small diameter ball end mill in the direction of the cutting trajectories for the larger diameter ball end mill are obtained. The reference cutting trajectories are divided at the same number of points at regular intervals in the direction of the reference cutting trajectory, and the lines obtained by plotting the corresponding dividing points on the respective reference cutting trajectories by straight lines are determined as the cutting trajectories for the small diameter ball end mill.

4 Claims, 10 Drawing Sheets

SURFACE TO BE CUT
S/D END MILL CUTTING TRAJECTORY
BROKEN LINES

SURFACE TO BE CUT 5,383,131

METHOD OF DETERMINING CUTTING TRAJECTORY IN N/C MACHINING SYSTEM

BACKGROUND OF THE INVENTION

1. Field of the Invention

This invention relates to a method of determining a cutting trajectory of a tool when machining a work by an N/C (numerical control) machining system, for instance, on the basis of three-dimensional shape data prepared by CAD (computer-aided design).

2. Description of the Prior Art

Recently there has been put into wide use an automatic programming system in which a computer is employed to control an NC machining system.

For example, when a pressing die having a complicate curved surface is machined, the surface of a work is directly cut using N/C data prepared from CAD (computer-aided design) data without using a plaster master or the like.

In the N/C machining system, the tool for cutting a work is first positioned away from the work and is moved toward the work to be brought into contact with the work at a part to be cut. After cutting the part, the tool is removed from the work, and is moved to another part to be cut if any, and finally is returned to the original position. The path along which the tool is moved during cutting operation on each part to be cut is determined on the basis of the shape of the surface to be formed thereon using the CAD data. In this specification, the path of the tool along which the tool is to be moved during cutting operation on each part to be cut will be referred to as "cutting trajectory", and the path of the tool along which the tool is to be moved in the whole cutting operation including the path aloha which the tool is moved toward the work from the original position to the inlet end of the cutting trajectory for the first part to be cut, the path along which the tool is returned to the original position from the outlet end of the cutting trajectory for the last part to be cut and the paths along which the tool is moved from part to part as well as the respective cutting trajectories will be referred to as "tool running path" in order to make a distinction therebetween.

When cutting a work with a ball end mill, a region at a corner portion of the work is left uncut as can be seen from From FIG. 11 when the diameter of the ball end mill R is large. (The region left uncut will be referred to as "leftover portion" in this specification.) The leftover portion must be manually finished later, which results in deterioration in accuracy and increase in man-hours. On the other hand, when the work is cut with a ball end mill having such a small diameter that can cut the corner portion with no leftover portion, the tool feed speed must be greatly lowered, which results in great increase in the machining time.

In view of the problems described above, the leftover portion produced by a large diameter ball end mill is cut with a plurality of tools which are gradually reduced in diameter. See, for instance, Japanese Unexamined Patent Publication No. 3(1991)-62204. In order to execute this method, the cutting trajectories for the small diameter ball end mills must be prepared in addition to those for the large diameter ball end mill.

When a work is cut with a plurality of ball end mills having different diameters, conventionally, the cutting trajectory is once prepared also for the small diameter (r) ball end mill over the entire cutting area of the work as shown in FIG. 12. Then the leftover portion is determined reading the drawing and is represented by broken lines which are approximated to the shape of the curved surface to be formed as shown in FIG. 13A. Then the part of the cutting trajectory other than the part for the leftover portion is trimmed and the cutting trajectory for cutting the leftover portion with the small diameter ball end mill in the same direction as the direction of the cutting trajectory for the large diameter ball end mill is output from the computer as shown in FIG. 13B.

In accordance with the conventional method described above, a very long time is required to calculate the cutting trajectory data by the computer and due to a large amount of data, a large capacity memory is required.

Further, determination of the leftover portion, representation of the leftover portion by the broken lines and trimming of the cutting trajectory which are executed by the operator take a long time and at the same time the accuracy of the data deteriorates due to such manually-performed editing operations.

Further since the leftover portion is formed as an elongated area extending perpendicular to the cutting trajectory for the large diameter ball end mill, the small diameter ball end mill must be moved back and forth many times over a very short distance, which greatly adds to the machining time.

SUMMARY OF THE INVENTION

In view of the foregoing observations and description, the primary object of the present invention is to provide a method of determining the cutting trajectory which can greatly reduces the man-hours as well as the machining time when the leftover portion produced by a large diameter ball end mill is cut with a small diameter ball end mill.

The method of the present invention is for cutting, with a small diameter ball end mill, leftover portions produced by cutting the work with a large diameter ball end mill and comprises the steps of identifying the leftover portions in the directions of the cutting trajectories for the large diameter ball end mill which are set at regular pitches, obtaining reference cutting trajectories for the small diameter ball end mill which are the cutting trajectories when cutting the leftover portions with the small diameter ball end mill in the direction of the cutting trajectories for the large diameter ball end mill, dividing each of the reference cutting trajectories at the same number of points at regular intervals in the direction of the reference cutting trajectory, and determining the lines obtained by plotting the corresponding dividing points on the respective reference cutting trajectories by straight lines as the cutting trajectories for the small diameter ball end mill.

In a preferred embodiment of the present invention, when the bend of the lines obtained by plotting the corresponding dividing points is sharper than a predetermined degree, the lines are corrected to be smoother.

Further it is preferred that the number of the dividing points be determined on the basis of the longest reference cutting trajectory.

DESCRIPTION OF THE PREFERRED EMBODIMENT

Figure 1:
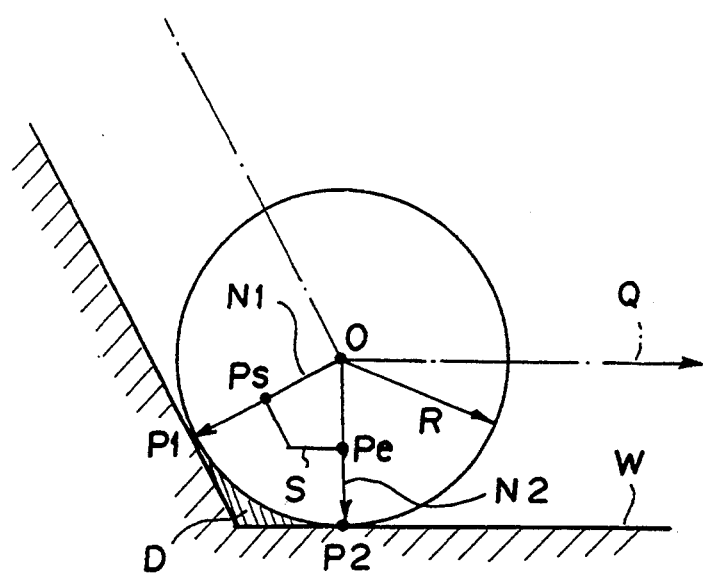
FIG. 1 is a schematic view for illustrating a manner for identifying the leftover portion and preparing the reference cutting trajectory.

In one embodiment of the present invention, the leftover portion produced by a large diameter ball end mill are identified in the following manner. That is, in FIG. 1, a circle having a diameter equal to the diameter R (e.g., 25 mm) of the large diameter ball end mill and having a center O on the moving path of the center of the spherical tip of the large diameter ball end mill is depicted in the plane which includes the cutting trajectory for the large diameter ball end mill extending along the cut surface W of the work and is perpendicular to the cut surface W, and when the circle contacts with the cut surface W at two points P1 and P2, the area between two vectors (normals) N1 and N2 respectively joining the center O and the contact points P1 and P2 is determined to be the leftover portion D.

The cutting trajectory S for the small diameter ball end mill having a diameter of r (e.g., 10 mm) when the small diameter ball end mill cuts the leftover portion D in the direction of the cutting trajectory Q for the large diameter ball end mill is generated between points Ps and Pe. The points Pe and Ps are the points at which the moving path of the center of the spherical tip of the small diameter ball end mill along the cutting trajectory S intersect the vectors N1 and N2. The cutting trajectory S forms said reference cutting trajectory.

Such a reference cutting trajectory S is obtained for each of the cutting trajectories for the large diameter ball end mill, and the cutting trajectories for the small diameter ball end mill are generated within the area circumscribed by the three-dimensional curve passing through the end points of the reference cutting trajectories S.

Figure 2:
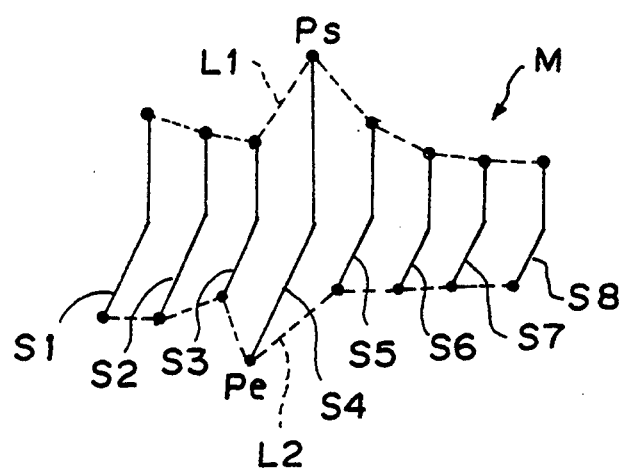
FIG. 2 is a schematic view showing the reference cutting trajectories in the leftover area.

FIG. 2 shows the simplified leftover portions M. In FIG. 2, S1 to S8 denotes the reference cutting trajectories S.

Figure 3:
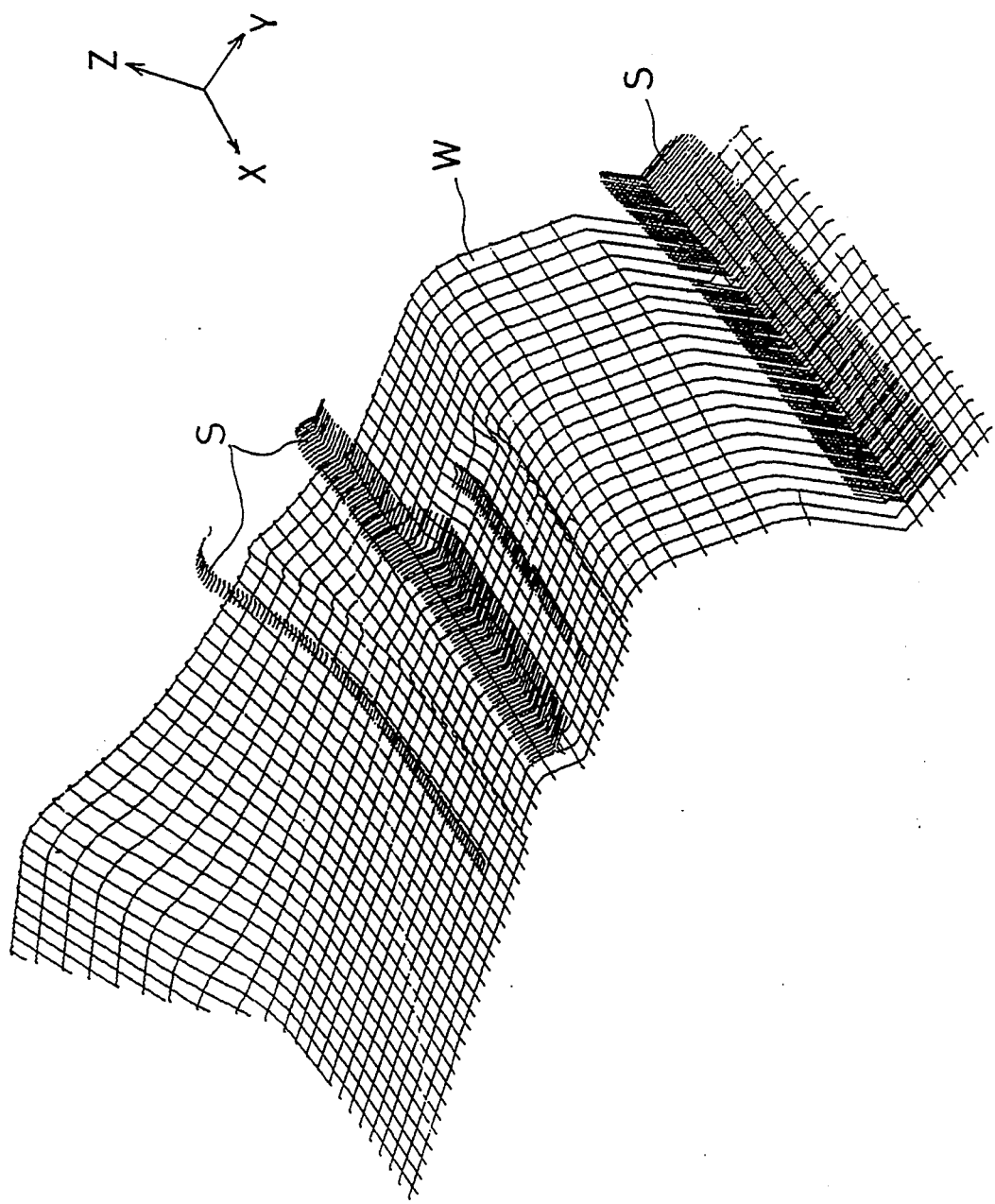
FIG. 3 is a perspective view showing an example of the surface to be cut.
Figure 4:
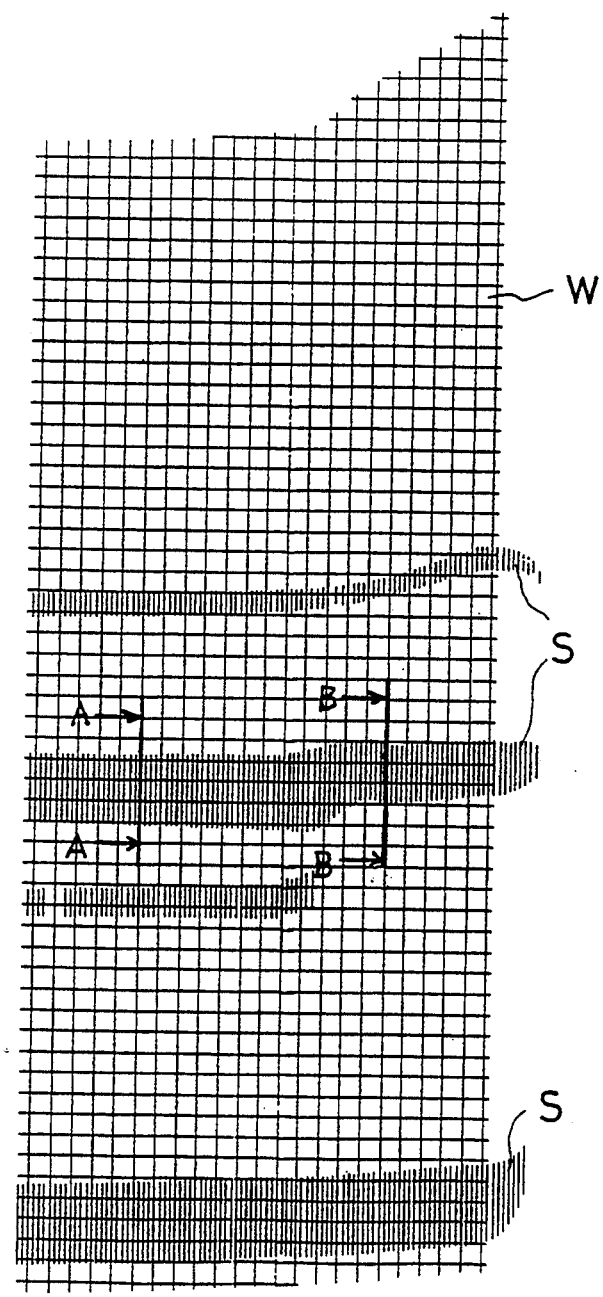
FIG. 4 is a plan view of the same.

FIG. 3 is a perspective view showing the surface to be cut of a pressing die. The reference cutting trajectories S are depicted at fine pitches on the surface W to be cut by lines written at regular intervals in the directions of X-axis and Y-axis on the plan view shown in FIG. 4.

Figure 5:
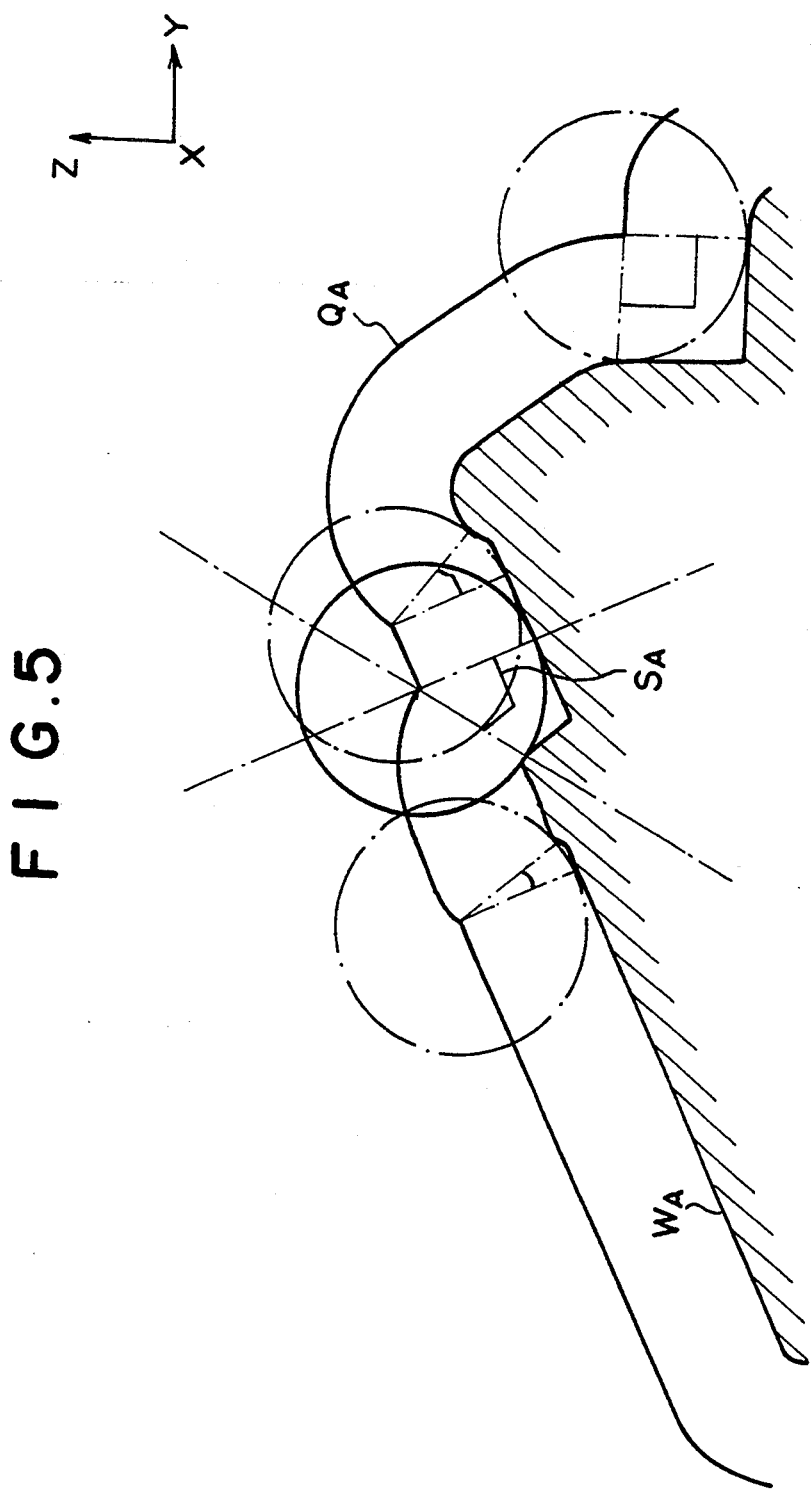
FIG. 5 is a cross-sectional view taken along line A—A in FIG. 4.
Figure 6:
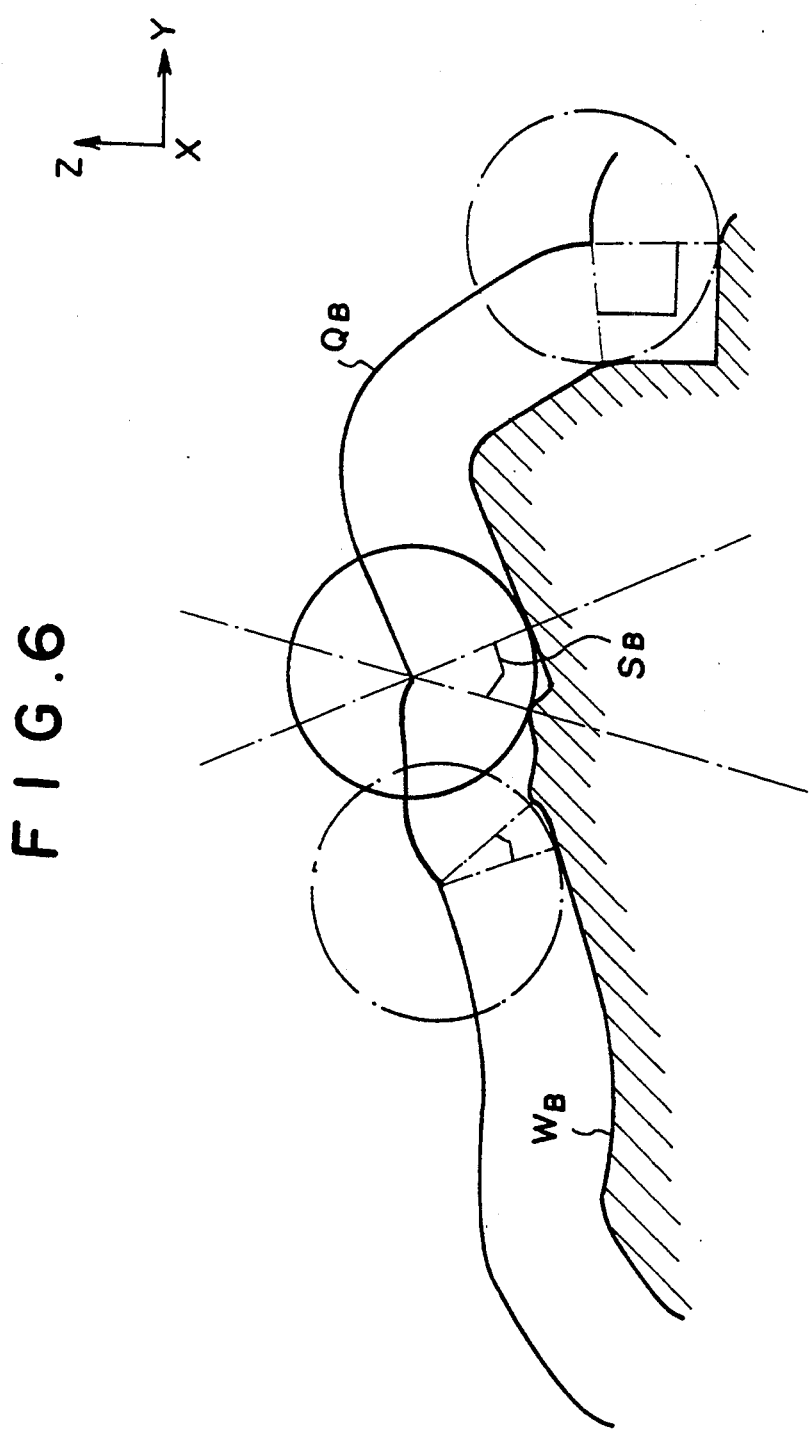
FIG. 6 is a cross-sectional view taken along line B—B in FIG. 4.
Figure 7:
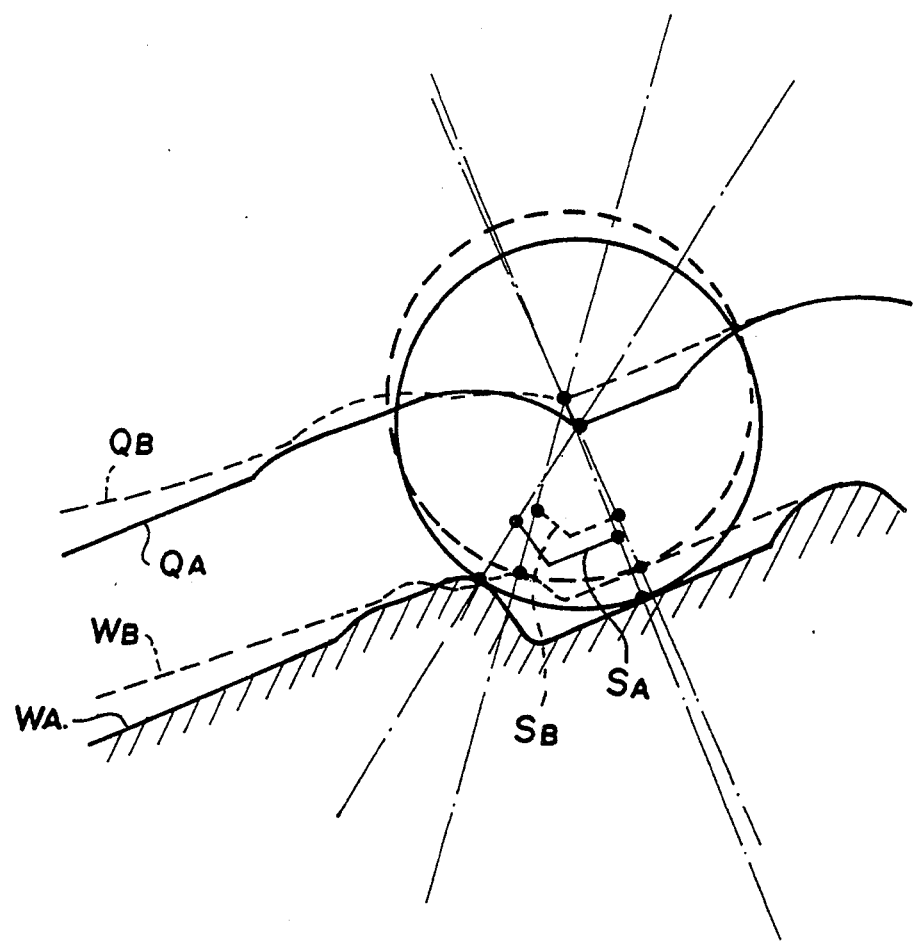
FIG. 7 is an enlarged cross-sectional view showing a part of FIG. 5 superposed on the corresponding part of FIG. 6, FIGS. 8A and 8B are view for illustrating the methods of correcting the cutting trajectory data for the small diameter ball end mill.

FIGS. 5 and 6 are cross-sectional views taken along lines A—A and B—B, respectively. In FIG. 5, QA denotes the cutting trajectory for the large diameter ball end mill in the cross-section along line A—A, SA denotes the reference cutting trajectory in the cross-section along line A—A, and WA denotes the surface to be cut in the cross-section along line A—A. Similarly in FIG. 5, QB denotes the cutting trajectory for the large diameter ball end mill in the cross-section along line B—B, SB denotes the reference cutting trajectory in the cross-section along line B—B, and WB denotes the surface to be cut in the cross-section along line B—B. FIG. 7 is an enlarged cross-sectional view showing a part of FIG. 5 superposed on the corresponding part of FIG. 6.

As can be seen from FIG. 7, the reference cutting trajectories SA and SB differ from each other in length and in position of the end points. That is, FIG. 2 schematically shows that the lengths of the leftover portions as measured in the direction of the cutting trajectories for the large diameter ball end mill differ from each other in an leftover area M (FIG. 9) where the leftover portions are continuous in the direction of X-axis.

After the leftover portions produced by the large diameter ball end mill are identified and the reference cutting trajectories S1 to S8 are obtained for the respective leftover portions in the manner described above, the corresponding end points of the reference cutting trajectories S1 to S8 are respectively joined by straight lines as shown by the broken lines in FIG. 2, and the degree of bend of the respective paths L1 and L2 formed by the straight lines between adjacent reference cutting trajectories is determined. When the degree of bend of the paths L1 or L2 is larger than a predetermined value, the path L1 or L2 is corrected to be more smooth.

Figure 8A:
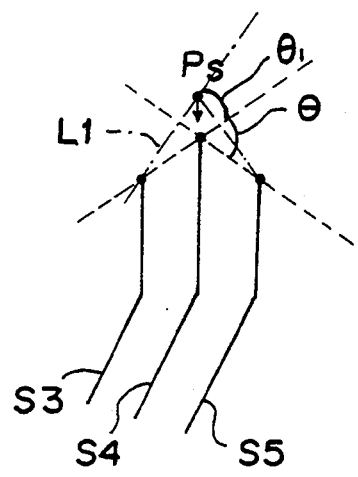

That is, when the angle between two straight lines intersecting at each end points, for example, when the angle $\phi 1$ (FIG. 8A) between the straight line joining the end points of the reference cutting trajectories S5 and S4 and the straight line joining the end points of the reference cutting trajectories S3 and S4 is larger than a predetermined angle $\phi$, the reference cutting trajectory S4 is shortened so that the angle $\phi 1$ becomes equal to the predetermined angle $\phi$.

Figure 8B:
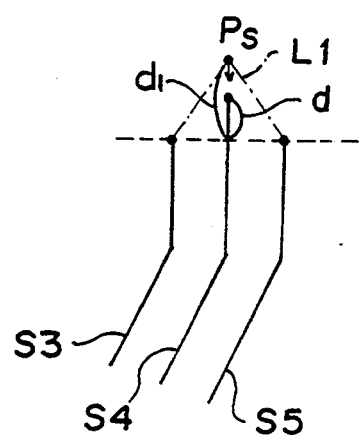

In another method of correction, when the distance d1 (FIG. 8B) between the end point of one reference cutting trajectory, e.g., S4, and the line joining the end points of the reference cutting trajectories S3 and S5 adjacent to the reference cutting trajectory S4 on opposite sides thereof is larger than a predetermined distance d, the reference cutting trajectory S4 is shortened so that the distance d1 becomes equal to the predetermined distance d.

Figure 9:
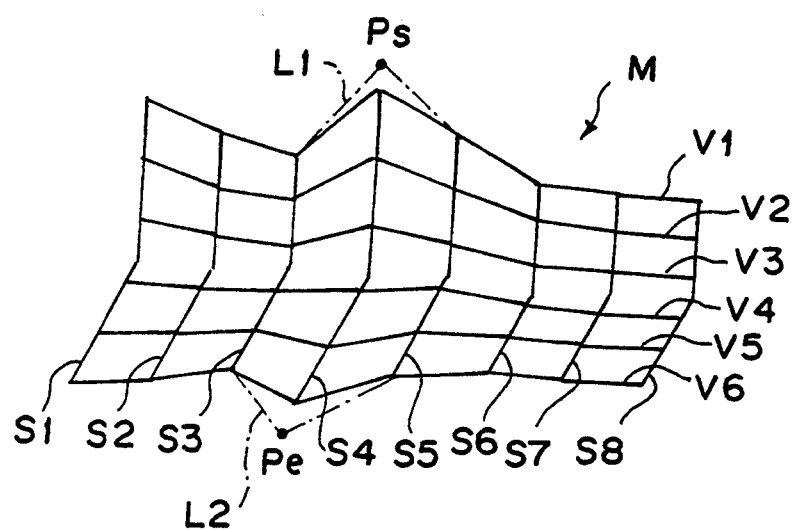
FIG. 9 is a view for illustrating the manner of determining the cutting trajectories for the small diameter ball end mill.

Then the longest reference cutting trajectory (S4 in this example) is selected and is divided, as shown in FIG. 9, at a plurality of points (four in FIG. 9) at regular intervals equal to the cutting pitches of the small diameter ball end mill in the direction of the reference cutting trajectory. Then the other reference cutting trajectories S1 to S3 and S5 to S8 are divided at the same number of points and the lines V1 to V6 obtained by plotting the corresponding dividing points on the respective reference cutting trajectories S1 to S8 are determined as the cutting trajectories for the small diameter ball end mill.

That is, the cutting trajectories obtained in accordance with the present invention extend in the longitudinal direction of the leftover area M. Accordingly, the machining time can be shortened as compared with the case where the leftover area M is cut along the reference cutting trajectories S1 to S8, and the load on the small diameter ball end mill is reduced and may be uniform.

Further since the leftover portions can be automatically identified and the cutting trajectories are generated only for the leftover portions, the man-hours required for edition of the cutting trajectories can be greatly reduced.

Figure 10:
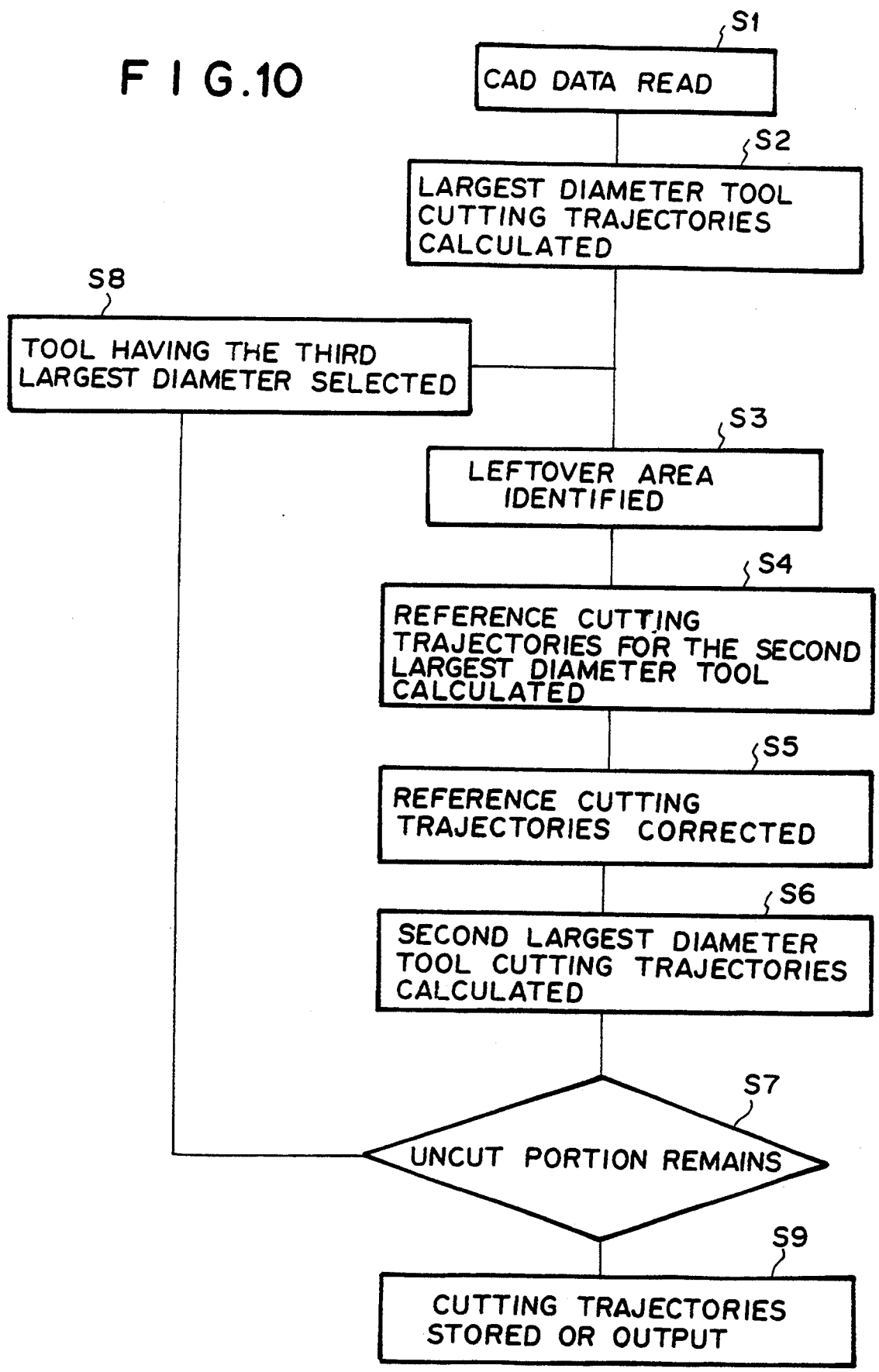
FIG. 10 is a flow chart for illustrating an example of the operation of the computer when determining cutting trajectories for a plurality of ball end mills using the method of the present invention.
Figure 11:
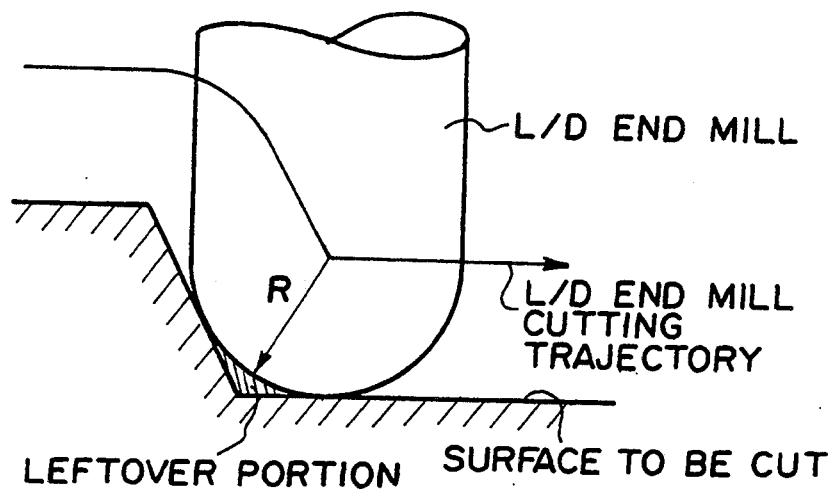
FIG. 11 is a schematic view showing the leftover portion produced by a large diameter ball end mill.
Figure 12:
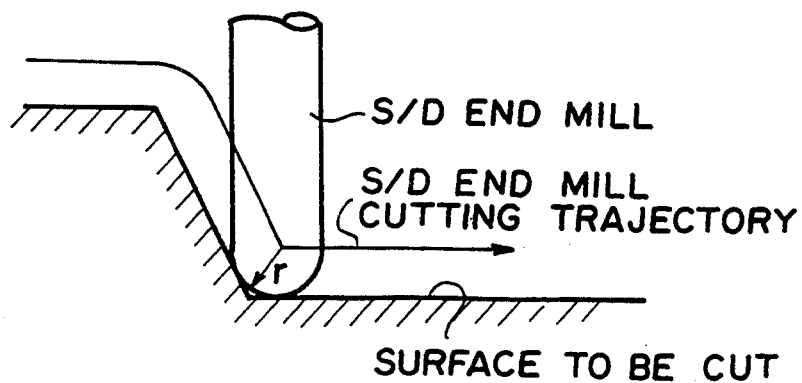
FIG. 12 is a schematic view showing the cutting trajectory of the small diameter ball end mill when cutting the leftover portion in accordance with the conventional method.
Figure 13A:
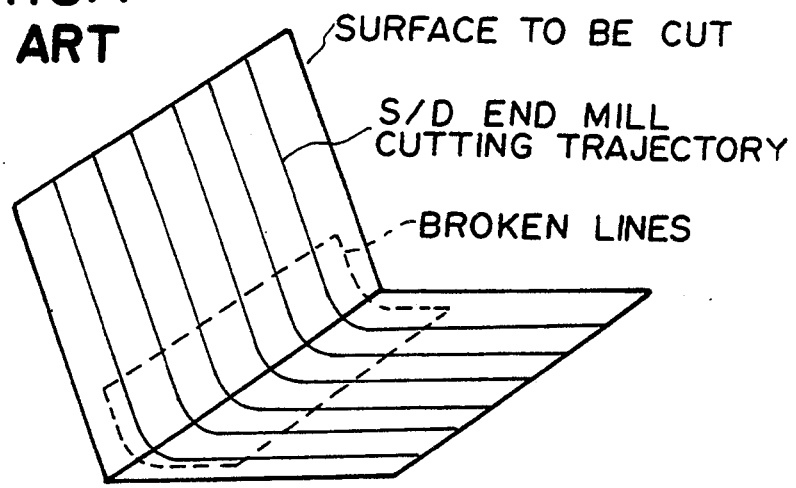
FIGS. 13A and 13B are views for illustrating the conventional method of determining the cutting trajectories for the small diameter ball end mill.
Figure 13B:
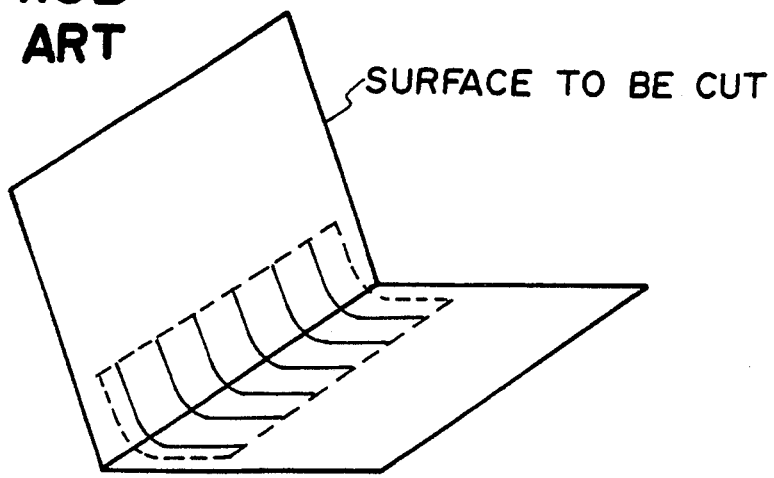

FIG. 10 is a flow chart for illustrating an example of the operation of the computer when determining cutting trajectories for a plurality of ball end mills using the method of the present invention.

In FIG. 10, the computer first reads the CAD data. (step S1) Then the computer calculates the cutting trajectories for the ball end mill having the largest diameter on the basis of the CAD data. (step S2) Then the computer identifies the leftover area produced by the largest diameter ball end mill in the manner described above and calculates the reference cutting trajectories for the ball end mill having the second largest diameter. (steps S3 and S4) Thereafter the computer corrects the reference cutting trajectories in the manner shown in FIGS. 8A or 8B if necessary and calculates the cutting trajectories for the ball end mill having the second largest diameter. (steps S5 and S6) Then the computer determines whether there remains any part left uncut in step S7. When it is determined there is a part left uncut, the computer selects ball end mill having the third largest diameter (step S8) and repeats steps S3 to S8 until the part left uncut is nullified. Then the computer stores in a memory or outputs the cutting trajectories thus determined. (step S9)

What is claimed is:

1. In a numerical control machining system, a method of determining a cutting trajectory for a small diameter ball end mill when cutting a leftover area on a work produced by cutting the work with a larger diameter ball end mill, the leftover area being an area formed of leftover portions which are left uncut on the respective cutting trajectories of the larger diameter ball end mill, said method comprising the steps of identifying the leftover portions in the directions of the cutting trajectories for the larger diameter ball end mill which are set at regular pitches, obtaining reference cutting trajectories for the small diameter ball end mill which are imaginary cutting trajectories in the same direction as the cutting trajectories for the larger diameter ball end mill, dividing each of the reference cutting trajectories at dividing points which are of the same number for all the reference cutting trajectories and which are positioned at regular intervals in the direction of the reference cutting trajectory, and plotting the cutting trajectories for the small diameter ball end mill by connecting the corresponding dividing points of the respective reference cutting trajectories with straight lines.

2. A method as defined in claim 1 in which when the lines obtained by plotting the corresponding dividing points of the reference cutting trajectories bend sharper than a predetermined degree, the reference cutting trajectories are corrected so that the lines are smoothed, and each of the reference cutting trajectories is divided after the correction.

3. A method as defined in claim 1 or 2 in which the number of the dividing points be determined on the basis of the longest reference cutting trajectory.

4. A method as defined in claim 1 in which a circle having a diameter equal to the diameter of the larger diameter ball end mill and having a center on the moving path of the center of the spherical tip of the larger diameter ball end mill is depicted in the plane which includes the cutting trajectory for the larger diameter ball end mill extending along the cut surface of the work and is perpendicular to the cut surface, and when the circle contacts with the cut surface at two points, the area between two vectors respectively joining the center of the circle and the contact points is determined to be the leftover portion.

* * * * *